United States Patent [19]
Page

[11] Patent Number: 5,453,899
[45] Date of Patent: Sep. 26, 1995

[54] LIGHTNING PROTECTION DEVICE

[76] Inventor: J. Dennis Page, 308 McCall Rd., Springfield, Ga. 31329

[21] Appl. No.: 42,803

[22] Filed: Apr. 5, 1993

[51] Int. Cl.⁶ .................................................... H02H 3/22
[52] U.S. Cl. ............................... 361/1; 307/139; 307/117
[58] Field of Search ............................. 361/1, 117, 139, 361/111, 120, 170; 307/139, 117

[56] References Cited

U.S. PATENT DOCUMENTS

| | | |
|---|---|---|
| 1,859,125 | 5/1932 | Bethenod . |
| 3,891,919 | 6/1975 | Penninger . |
| 4,095,262 | 6/1978 | St. Clair . |
| 4,276,576 | 6/1981 | Uman et al. ................................. 361/1 |
| 5,083,042 | 1/1992 | Merchant ................................. 361/149 |

OTHER PUBLICATIONS

Markus, John, "Repeater Circuits", *Modern Electronic Circuits Reference Manual*, 1980, p. 867.
Plumer, J. Anderson, "We Need Better Lightning Protection", *Fire Journal*, Jan. 1987, pp. 41–45, 73.
Hasbrouck, Richard T., "Lightning—Understanding It and Protecting Systems From Its Effects", Lawrence Livermore National Laboratory, Livermore, Calif., 1990, pp. 601–638.
Shannon, Salley, "Watch Out For Summer Lightning", *Reader's Digest*, Aug. 1991, pp. 11, 14.

*Primary Examiner*—Todd DeBoer
*Attorney, Agent, or Firm*—Kilpatrick & Cody

[57] ABSTRACT

A simple, inexpensive automatic apparatus for unplugging electrical and electronic equipment from electrical circuits such as power, cable television and telephone circuits when an electrical storm is detected in the vicinity of the device by monitoring conditions that typically change near electric storms and, when one or more indicia of a storm are noted, physically disconnecting the device from the circuit(s) so that substantial insulation is interposed between the device and the circuit(s). In some configurations, re-connection of the electrical or electronic equipment automatically occurs after an electrical storm has passed.

15 Claims, 3 Drawing Sheets

LIGHTNING PROTECTION DEVICE

BACKGROUND OF THE INVENTION

This invention relates to devices for protection from damage by lightning of electrical and electronic equipment powered by conventional electrical power or attached to other circuits such as telephone and cable television circuits.

Lightning conceivably may have provided humankind with a first source of fire, but lightning has otherwise been a destructive force throughout human history. Strategies and apparatus for reducing the likelihood of damage by lightning are fairly old, including, for instance, lightning rods that have been in use for approximately 200 years. While the use of such rods and other precautionary steps and safety devices reduce the damage and injury that would otherwise result from lightning today, it remains an enormously dangerous natural phenomenon that claims hundreds of lives worldwide every year and destroys a substantial amount of property. Somewhat paradoxically, advances in other areas of technology have increased rather than diminished the damage caused by lightning. This is because relatively low voltage and current levels can damage integrated circuits and other modern electronic components, with the result that many electronic devices are more susceptible to lightning damage today than ever before, and many devices to which microprocessor technology has been added are more susceptible to lightning damage as a result of such improvements. Additionally, lightning is capable of inducing substantial currents not only in electrical circuits directly struck by it but also in circuits located within the magnetic field induced by a near by lightning strike, giving each strike enormous destructive potential. See e.g., Richard T. Hasbrouck, "Lightning—Understanding It and Protecting Systems from Its Effects," ISA paper no. 90–166, and J. Anderson Plumer, "We Need Better Lightning Protection," Fire Journal (Jan. 1987) at 41–45, 73, each of which articles are incorporated herein by reference.

Microelectronic components and circuitry are not only vulnerable to lightning but relatively ineffective as switches for use in apparatus for implementing preventive measures. This is because electrical "disconnection" achieved utilizing such circuitry nevertheless results in very close proximity of electrical components, and the voltages associated with both currents in electrical circuits induced by near by lightning strikes and direct strikes themselves can easily arc across substantial distances, frequently far exceeding the size of an entire microelectronic circuit or even the device using it. As a result, merely turning an appliance, electronic device or computer off will not protect it from lightning as long as it remains "plugged into" or otherwise connected to the power circuit. The only substantially effective protection is to unplug such devices or otherwise introduce substantial electrical insulation between the device and the power supply circuit.

The typical conductivity of indoor air may require on the order of 105 kilovolts to spark a distance of five centimeters. However, voltage surges on electrical circuits struck by or in the vicinity of lightning are often higher. Indeed, according to Hasbrouck, "Lightning—Understanding It and Protecting Systems from Its Effects," p. 611, a strike may have a peak voltage of 1.4 million volts. Thus, insulation between electrical equipment and an electrical circuit such as a power circuit must withstand a substantial voltage spike to avoid damage from a lightning-induced surge, and the insulation provided by air across a small separation between electrical contacts or components frequently is inadequate.

Numerous devices intended to deal with the risks associated with lightning or the like have previously been developed or proposed. For instance, U.S. Pat. No. 4,276,576 discloses a device that controls a relay to disconnect electrical equipment from an electric power source, controlled by logic circuitry that detects and responds to the electric field produced by charged clouds, the electric or magnetic field produced by a lightning discharge, or interruption of the electric power source.

U.S. Pat. No. 4,095,262 discloses a mechanical switch for disconnecting power and antennas connected to a television set.

U.S. Pat. No. 3,891,919 discloses a lightning detector that utilizes electronic circuitry to activate a signal device such as a light or an alarm in respond to simultaneous receipt of a signal (such as one produced by a lightning strike) at two different radio frequencies.

U.S. Pat. No. 1,859,125 discloses a device that can, in some configurations, disconnect a machine to be protected from the circuit it is in, in response to a spark or arc that generates, high frequency electromagnetic waves.

While the problem addressed by the present invention is widely and has long been recognized, and the above described and other inventions have sought to solve that problem, there remains a need for an inexpensive, highly effective device for the protection of electrically operated apparatus from damage by lightning that can be easily used, particularly in residential applications, without modification of existing electrical devices or electrical power circuits and which, in other embodiments, may be easily incorporated into existing devices.

SUMMARY OF THE INVENTION

The present invention is an apparatus for protecting electrical equipment from damage by lightning by automatically disconnecting the equipment from electrical circuits to which it is connected, such as power, telephone and cable television circuits. It includes a radio frequency receiver or other electrical storm detection means, such as an amplitude modulated receiver tuned to a very low frequency or within the AM commercial broadcast band that generates a voltage in response to radio frequency static resulting from lightning in the general vicinity of the receiver. Appropriate information processing circuitry can trigger an optional audible or a visible alarm and operates a relay or a solenoid that disconnects the electrical equipment from the power circuit in a manner that introduces substantial electrical insulation between the equipment and power circuit. This is accomplished, for instance, by expelling a wall plug (that terminates the equipment's power cord) from the socket within which it is positioned (thereby substantially separating the two components with air therebetween) or by otherwise separating the electrical contacts and interposing a highly effective insulating material therebetween. Where an optional alarm circuit is used, a delay between activation of the alarm and disconnection of the circuit is introduced. If no action is taken within a predetermined period of time to override the system, disconnection then automatically occurs. Such a delay will, for instance, permit data to be saved to the hard disk of a computer in use that is protected by the apparatus of the present invention before power to the computer is interrupted.

In some embodiments of the present invention, a user must manually reinsert the plug or otherwise reset the mechanism after the lightning storm has passed. In another embodiment, connection is automatically restored a predetermined interval after the storm has passed or ended, as determined, for instance, by the absence of lightning-induced radio frequency static. The receiver portion of the present invention can include an automatic frequency scanning capability that functions, for instance, when the device is first placed in service to locate a "clear channel." Alternative means for detecting a near electrical storm may also be used such as those disclosed in the article by Hasbrouck cited above, the electric field detecting means disclosed in U.S. Pat. No. 4,276,576, or optical detectors responsive to lightning flashes.

DETAILED DESCRIPTION OF THE DRAWINGS

Figure 1:
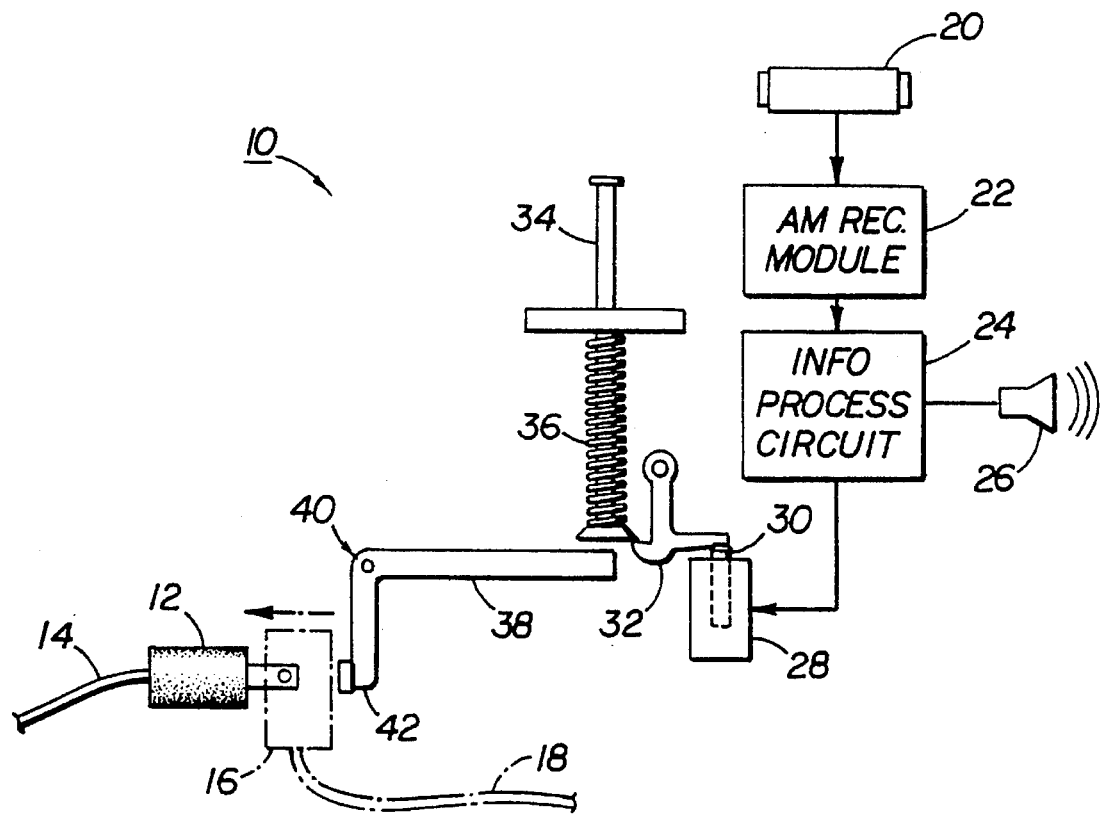
FIG. 1 is a schematic diagram of a first embodiment of the lightning protection apparatus of the present invention in which an electrical plug attached to equipment to be protected is expelled from a socket in the apparatus.

FIG. 1 is a schematic diagram of the first embodiment of the lightning protection apparatus 10 of the present invention. As will be readily apparent by reference to FIG. 1, conventional plug 12 connected by a power cord 14 to electrical or electronic equipment (not shown) is seated in a socket 16, thereby establishing electrical connection to the power circuit 18.

An appropriate radio frequency receiving antenna 20 is connected to a radio frequency receiver 22, which is in turn connected to information processing circuitry 24. Information processing circuitry 24 controls both (1) an optional alarm 26 that may, for instance, be an audible device, a visible warning device or both, and (2) an electrically actuated device for creating movement such as a solenoid 28 having a solenoid rod 30 that acts against a latch 32. When set, latch 32 holds spring loaded plunger 34 in its retracted position, loaded by compression spring 36. If latch 32 is released, plunger 34 extends (down in FIG. 1) as compression spring 36 expands, and plunger 34 acts against a plunger arm 38 of bellcrank 40, thereby causing pusher arm 42 of bellcrank 40 to act against plug 12 and expel it from socket 16.

Figure 3:
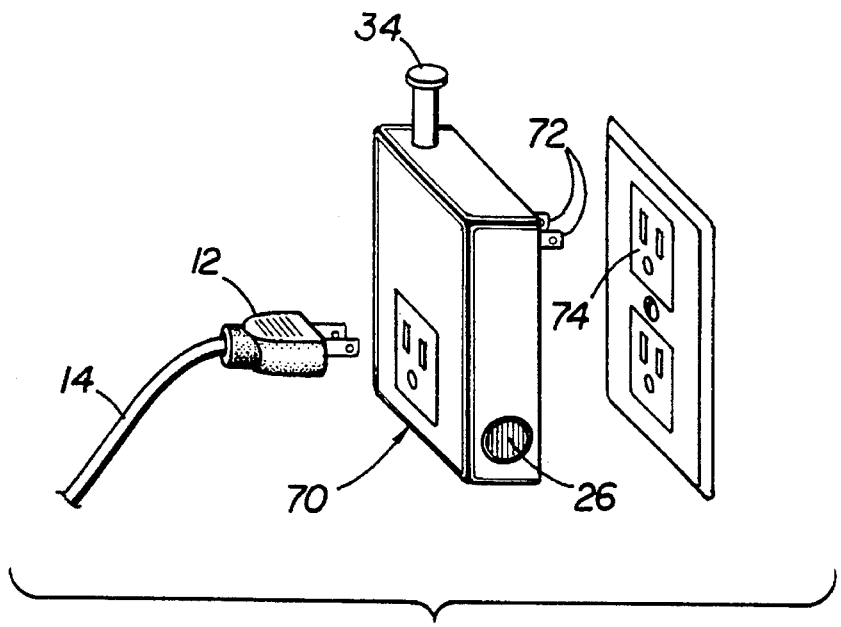
FIG. 3 is a perspective view of the outside of the apparatus of the present invention as embodied in FIG. 1, 2 or 5 and adapted for interposition between a conventional electric outlet wall socket and a conventional plug.

As will be readily appreciated, if the apparatus 10 illustrated in FIG. 1 is embodied in a configuration like that illustrated in FIG. 3 that is positioned in a conventional wall socket, expulsion of plug 12 will cause it to fall to the floor, thereby substantially physically separating plug 12 (and thus all of the electrical equipment (not shown) to which it is connected) from the electrical power circuit 18.

Antenna 20, receiver 22 and information processing circuitry 24 maybe provided in a wide variety of conventional configurations well within the understanding of one of ordinary skill in the art, including, for instance, the circuitry disclosed in U.S. Pat. No. 4,276,576 or that disclosed in U.S. Pat. No. 3,891,919, each of which patents are incorporated herein by reference. Antenna 20 and receiver 22 can be as simple, for instance, as a conventional portable AM radio that is connected, through the headphone output, to a light emitting diode display driver integrated circuit, the output of which drives a conventional solid state relay that in turn controls a conventional solenoid 28. With the receiver 22 tuned to a frequency on which no radio stations are transmitting, and the volume set appropriately, static generated by lightning in the vicinity of the receiver will actuate the solenoid, acting through the LED display driver integrated circuit and solid state relay, and actuation of the solenoid will, as described above, trip the latch 32, thereby causing the plunger 34 loaded by spring 36 to actuate the bellcrank 40 and expel plug 16.

Figure 2:
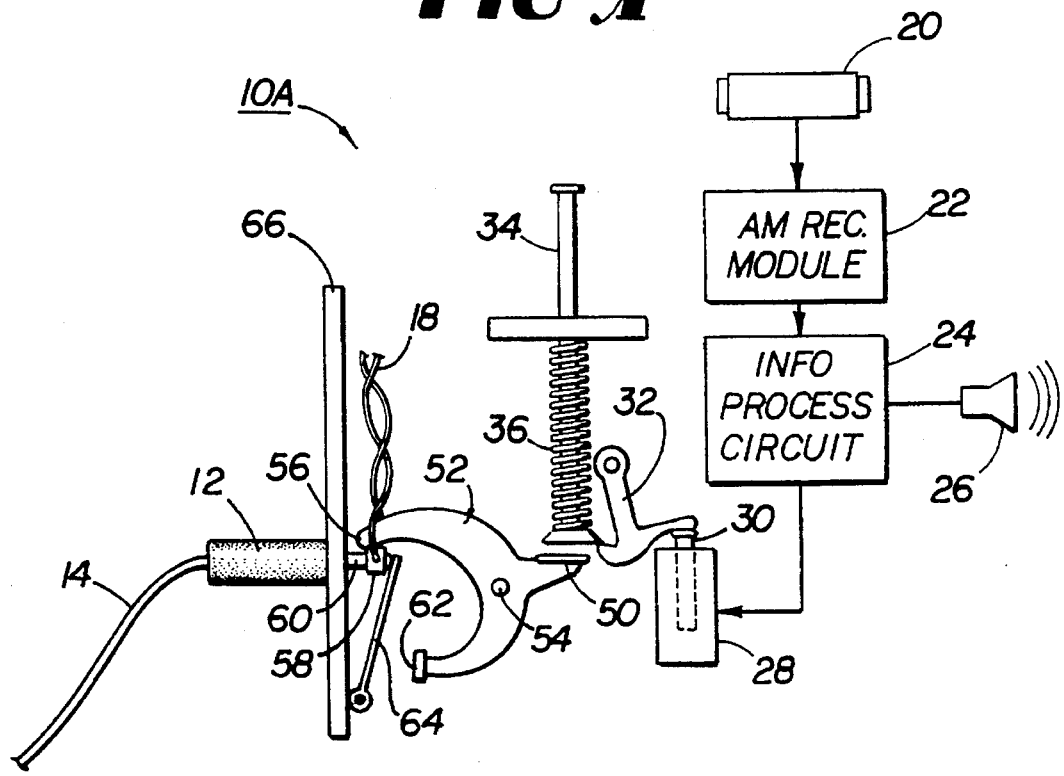
FIG. 2 is a schematic diagram of an alternative embodiment of the lightning protection apparatus of the present invention in which electrical contacts are removed from the plug prongs and the plug is expelled from the apparatus.

An alternative embodiment of the lightning protection apparatus of the present invention is shown as apparatus 10A in FIG. 2. Solenoid 28, solenoid rod 30, latch 32, spring 36 and plunger 34 function as described above. Plunger 34 acts instead, however, against a lever 50 on a C-shaped contact carrier and pusher 52 that pivots on a pin 54. Contact arm 56 of carrier/pusher 52 carries electrical contacts 58, the nearer one of which is visible in FIG. 2, which contacts slide against the prongs 60 of plug 12 in order to establish electrical connection with prongs 60. Pusher arm 62 of carrier/pusher 52 acts against an expulsion plate 64 that is pressed against the ends of plug 12 prongs 60 when apparatus 10A is actuated to expel plug 12 from plate 66 within which it is positioned for electrical connection to the power circuit 18 through contacts 58.

Figure 4A:
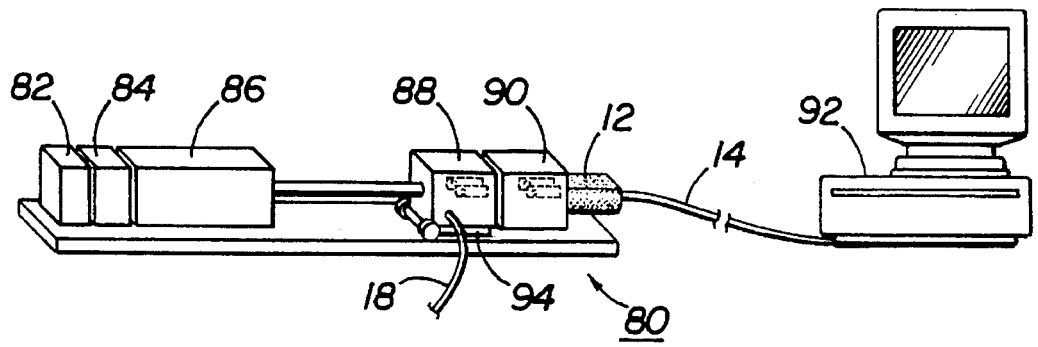
FIGS. 4A and 4B are schematic diagrams of a third embodiment of the apparatus of the present invention, shown in "connected" and "disconnected" conditions, respectively, in which electrical connection to a conventional device is broken and insulating material is interposed between the electrical contacts.
Figure 4B:
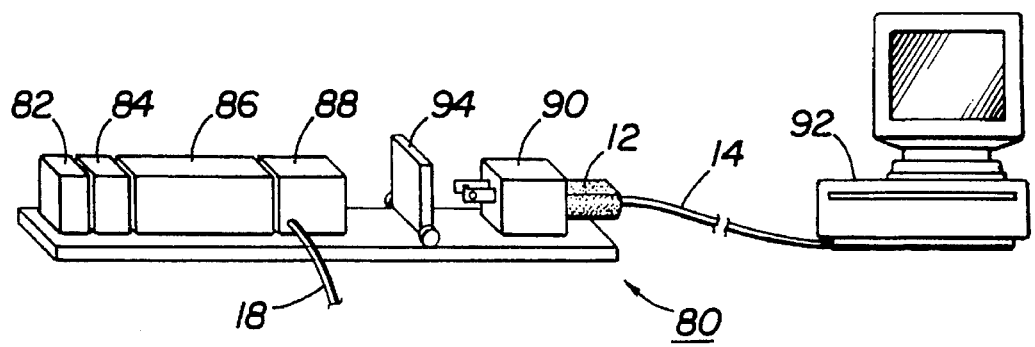

Another alternative embodiment of the present invention is conceptionally illustrated in FIGS. 4A and 4B. In this embodiment 80 of the lightning protection device of the present invention, a detector 82 detects an electrical storm in the vicinity of the apparatus 80 as described above or utilizing any other known detection mechanism. Signals from the detector 82 are processed by logic circuitry 84. Logic or information processing circuitry 84 controls a motor 86 that, upon actuation as illustrated in FIG. 4B, withdraws a socket 88 connected to power circuit 18 from contact with fixed plug/socket 90. A conventional plug 12 that is connected through power cord 14 to equipment 92 is inserted in fixed plug/socket 90. Significantly, a spring-loaded insulating barrier plate 94 is held by socket 88 in a folded position when socket 88 and plug/socket 90 are connected. While plug/socket 90 and socket 88 are illustrated as conventional plug and socket devices, such illustrations are conceptual, and alternative contacts might typically be used. Retraction of socket 88 permits barrier 94 to pivot upward so that it physically separates socket 88 from plug 90, thereby interposing the insulating material from which barrier 94 is constructed between socket 88 and plug 90 and thus substantially reducing the likelihood that a voltage peak on power circuit 18 caused by lightning will arc to plug 90 and damage equipment 92. Motor 86 may be a solenoid, a relay, a rotary motor or linear motor with appropriate gearing or any other device capable of moving one set of electrical contacts relative to another set of electrical contacts.

Logic circuit 84 can include a clock so that socket 88 is forced by motor 86 to reconnect with plug/socket 90 at a predetermined interval after disconnection or at a predetermined interval after an electrical storm in the vicinity of apparatus 80 is no longer detected. Alternatively, re-connection can occur after the monitored storm intensity drops below a predetermined level. This may be important with certain electrical and electronic equipment when damage or losses will result if power to the equipment is not restored relatively quickly. For instance, if power is not restored to freezers, refrigerators and furnaces, damages such as food spoilage or pipes broken from freezing may result. Similarly, in electronic equipment or electronically controlled equipment such as organs, computer and other equipment utilizing microprocessor technology where a battery backup system will stop functioning after a relatively short period of time, computer memory may be lost or other damage may occur if power is not quickly restored.

While the receiver or detector, logic circuitry and motor (or other similar components) of the present invention may be powered by power circuit 18, power may also be supplied by other means such as a battery. Such a separate power source will typically be required in the apparatus 80 of the present invention illustrated in FIGS. 4A and 4B where it is desired that the device 80 not be connected to power circuit 18 so that it will be protected from lightning damage, but power for detector 82, logic circuit 84 and solenoid 86 is required in order automatically to reconnect socket 88 to plug/socket 90 after the storm has passed.

As will be really appreciated by one of ordinary skill in the art, a wide variety of variations and modifications in the present invention can be made without departing from the intended scope of the preceding description and the following claims.

For instance, numerous alternative configurations can be utilized for devices for connection to, and automatic disconnection from, conventional electrical plugs in response to detection of lightning. Additionally, the apparatus illustrated and described above can be incorporated directly in equipment for the purpose of protecting such appliances from lightning strikes. In particular, for instance, the embodiment of the present invention illustrated in FIGS. 4A and 4B can be configured to be incorporated during original manufacture in an electrical equipment or appliance. It must be recognized, however, that optimal protection will be achieved only when the detector 82, logic circuitry 84 and solenoid 86 are themselves protected from possible lightning damage together with the remainder of equipment 92. Otherwise, the device of the present invention may succeed in its intended function but be itself damaged by a lightning strike. As will be readily appreciated, this is possible with respect to the embodiment of the present invention illustrated in FIG. 1.

Figure 5:
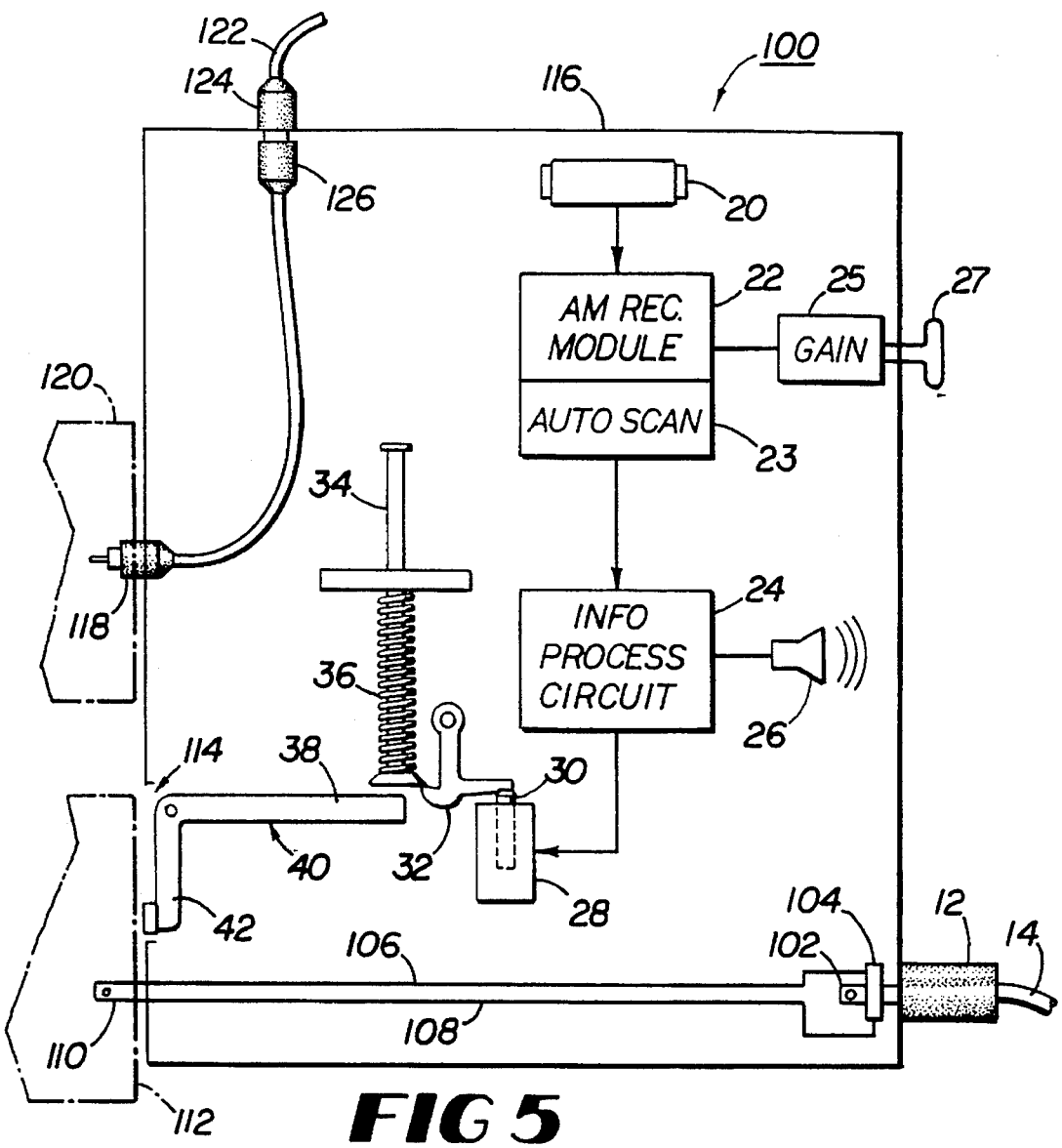
FIG. 5 is a schematic diagram of an embodiment of the lightning protection apparatus of the present invention similar to the embodiment illustrated in FIG. 1 but in which the device itself is expelled from a wall outlet when lightning is detected.
Figure 6:
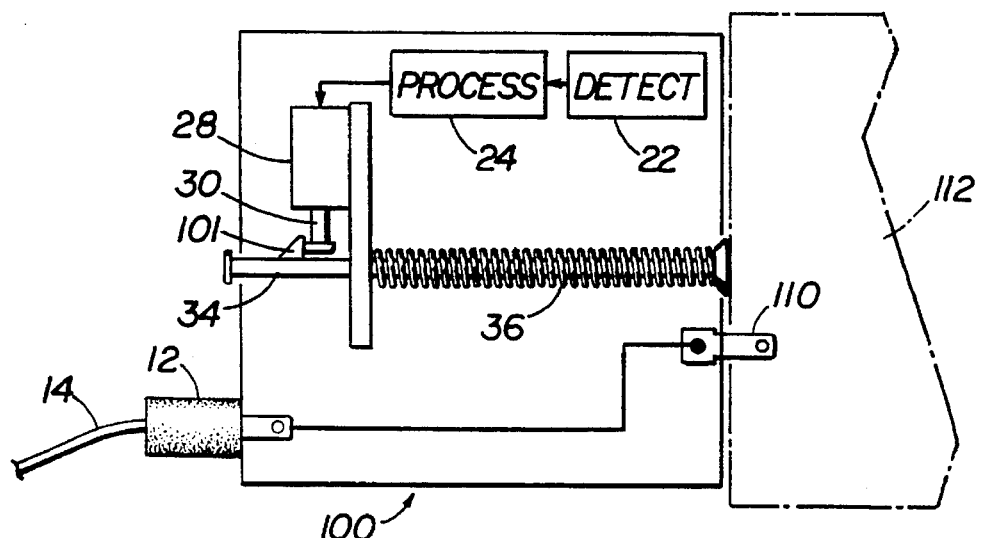
FIG. 6 is a simplified version of the apparatus shown in FIG. 5.

This may be avoided, however, in an embodiment of the invention generally in the form illustrated in FIG. 3 in which the plug 12 connected to power cord 14 is not necessarily expelled from the protected device 70 but rather the prongs 72 of device 70 are withdrawn from the conventional outlet 74. Such embodiments are illustrated in FIGS. 5 and 6. The lightning protection apparatus 100 illustrated in FIG. 5 contains electrical storm detection and actuation devices similar to those illustrated in FIGS. 1 and 2 and described above, but plug 12 connected to power cord 14 is not expelled from the device 100 when lightning is detected. Instead, plug 12 remains plugged into the device 100, where its prongs 102 touch contacts 104 (only one of which is visible) that are connection through conductors 106 and 108 to prongs 110 (only one of which is visible) that plug into a conventional electrical power outlet. When an electrical storm is detected and pusher arm 42 is actuated as described above, it presses against face 112 of the conventional outlet (through, for instance, a slot 114 in housing 116), thereby causing withdrawal of the prongs 110 from that outlet. This results in both disconnection of the device connected to plug 12 through cord 14 from the power circuit and disconnection and separation of device 100 from that circuit. An alternative configuration that achieves comparable results would utilize prongs 110 that withdraw from the wall outlet and into the housing 116 of device 100 when lightning is detected.

Apparatus 100 is further refined by the inclusion, in receiver 22, of automatic frequency scanning circuitry 23 that automatically scans a radio frequency band, each time the apparatus 100 is supplied with electrical power, for instance, and selects a clear frequency on which no station is broadcasting for monitoring. A gain control circuit 25 operated by knob 27 may be utilized to adjust the sensitivity of apparatus 100 and thus the distance within which electrical storms will be detected or sensitivity to actuation by spurious signals not caused by electrical storms.

An alternative, simplified version of the apparatus 100 of FIG. 5 is illustrated in FIG. 6, where plunger 34 is held in its retracted position by normally extended solenoid rod 30 of solenoid 28 acting against a catch 101 on plunger 34. When detector 22 detects an electrical storm, solenoid rod 30 is withdrawn into solenoid 28, releasing plunger 34, which is driven against outlet 112 by spring 36, causing withdrawal of prongs 110 from outlet 112.

As indicated above, a wide variety of means may be utilized for detecting the presence of an electrical storm or lightning in the vicinity of the apparatus of the present invention, including detectors responsive to the electric field produced by charged clouds, receivers that monitor one or more radio frequencies to detect electromagnetic radiation produced by lightning and optical sensors that are triggered by radiation in the visible, infrared or ultraviolet spectrums. Depending on the level of sophistication desired, multiple-frequency monitoring, as taught, for instance, by U.S. Pat. No. 3,891,919, may be utilized. Additionally, multiple mode monitoring may be utilized, such as by monitoring both optical and radio frequency portions of the spectrum. Furthermore, it is possible to monitor the power circuit itself for "noise" and voltage surges or interruptions that suggest a risk of a lightning strike that would cause a potentially damaging voltage surge.

A wide variation in the sophistication of signal monitoring and processing is also possible, including, in the course of signal processing, monitoring of variations in signal intensity, frequency and duration and measuring intervals between signals for the purpose of triggering the disconnection apparatus of the present invention when a predetermined electrical storm intensity or estimated proximity has been reached.

The apparatus of the present invention may also be used with appropriate modification for disconnection (upon detection of an electrical storm in the vicinity) of electrical equipment from electrical circuits susceptible to lightning other than power circuits. Such other circuits include, among others, antenna circuits, cable television circuits and telephone circuits. For instance, an appropriately configured apparatus of the present invention can simultaneously disconnect a television receiver from the electrical power circuit and the cable television or antenna circuit to which it is connected when an electrical storm is detected, thereby protecting the television receiver from lightning damage on either the power or television signal circuits.

Specifically, apparatus 100 illustrated in FIG. 5 may include a coaxial plug 118 that is inserted in a cable wall outlet 120 and that connects that outlet to cable 122 attached to the equipment (not shown) through a plug 124 on the end of cable 122 and a socket 126 mounted on housing 116. Actuation of apparatus 100 thus disconnects both electrical power and television signal circuits.

While the present invention is described above principally by reference to the use of a spring loaded plunger controlled by a solenoid actuated latch, one of ordinary skill in the art will readily recognize that a wide variety of other devices, including conventional relays, and pneumatically and hydraulically activated devices, may be alternatively utilized in order to implement the invention and enjoy its benefits.

I claim:

1. A lightning protection apparatus for protecting equipment that is normally connected to an electrical circuit, comprising:
   a. means for connecting the apparatus to the electrical circuit and a means for connecting a piece of electrical equipment to the apparatus,
   b. means for establishing electrical connection between the apparatus connecting means and the equipment connecting means,
   c. means for detecting the presence of an electric storm in the vicinity of the apparatus, and
   d. means responsive to the detection means for interrupting the electrical connection between the apparatus and the equipment and interposing insulation therebetween.

2. The apparatus of claim 1 further comprising an alarm actuated by the detection means for indicating imminent actuation of the interruption means.

3. The apparatus of claim 2 wherein the alarm produces an audible signal.

4. The apparatus of claim 1 wherein the information processing means actuates the interrupting means to reconnect the equipment to the electrical source a predetermined interval of time after no electrical storm is detected in the vicinity of the apparatus.

5. The apparatus of claim 1 further comprising means for disconnecting the equipment from a second electrical circuit when interrupting means is actuated.

6. A lightning protection apparatus for protecting a piece of equipment operated from an electrical source, comprising:
   a. a socket for receiving a plug electrically attached to the piece of equipment through a cord connecting the plug to the equipment,
   b. prongs for connecting the apparatus to the electrical source by insertion of the prongs in an electrical outlet connected to the electrical source,
   c. means for detecting the presence of an electrical storm in the vicinity of the apparatus, and
   d. means responsive to the detection means for expelling either the plug from the socket or the prongs from the outlet when an electrical storm is detected by the detection means.

7. A lightning protection apparatus for protecting a piece of equipment operated from an electrical source, comprising:
   a. a socket for receiving a plug electrically attached to the piece of equipment through a cord connecting the plug to the equipment,
   b. prongs for connecting the apparatus to the electrical source by insertion of the prongs in an electrical outlet connected to the electrical source,
   c. means for detecting the presence of an electrical storm in the vicinity of the apparatus,
   d. means for processing signals received from the detection means, and
   e. a spring-actuated plunger, and
   f. means for holding the plunger in a retracted position with the spring loaded and for releasing the plunger when an electrical storm is detected so that the plunger will push the apparatus away from, and withdraw the prongs from, the outlet.

8. A lightning protection apparatus for protecting a piece of equipment operated from an electrical source, comprising:
   a. a socket for receiving a plug electrically attached to the piece of equipment through a cord connecting the plug to the equipment,
   b. prongs for connecting the apparatus to the electrical source by insertion of the prongs in an electrical outlet connected to the electrical source,
   c. means for detecting the presence of an electrical storm in the vicinity of the apparatus,
   d. means for processing signals received from the detection means,
   e. a spring-actuated plunger,
   f. a latch for holding the plunger in a retracted position,
   g. a pusher operated by the plunger for expelling one of
   (i) the plug from the socket or
   (ii) the prongs from the outlet, and
   h. actuation means for releasing the latch responsive to the signal processing means when the detection means detects an electrical storm.

9. A lightning protection apparatus for protecting equipment connected to an electrical circuit from lightening-induced voltage surges on that circuit, comprising
   a. a radio-frequency antenna connected to
   b. a radio-frequency receiver coupled to
   c. an information processing circuit that drives
   d. a solenoid that releases
   e. a latch that restrains
   f. a spring loaded plunger that, when released,
   disconnects the equipment from the electrical circuit.

10. The apparatus of claim 9, wherein the equipment includes an electrical plug and the plunger acts against a pusher that disconnects the plug from the electrical source.

11. The apparatus of claim 9, wherein the equipment is electrically connected to prongs and the plunger acts against a pusher that disconnects the prongs from the electrical source.

12. The apparatus of claim 9 further comprising solid insulating material that is interposed between the electrical equipment and the electrical source when the equipment is disconnected.

13. The apparatus of claim 9 further comprising an alarm that is actuated by the information processing circuit before the solenoid is released.

14. The apparatus of claim 9 wherein the radio frequency receiver further comprises an automatic frequency scanning circuit for finding a clear frequency for monitoring signals generated by an electrical storm in the vicinity of the apparatus.

15. The apparatus of claim 9 wherein the receiver further comprises a gain control for adjusting the sensitivity of the receiver.

* * * * *